United States Patent [19]

Yamamoto et al.

[11] 4,424,704

[45] Jan. 10, 1984

[54] KNOCK DETECTING APPARATUS FOR INTERNAL COMBUSTION ENGINE

[75] Inventors: Noboru Yamamoto, Kariya; Tomoatsu Makino, Okazaki; Ryoichi Okuda, Kariya; Hiroshi Sakurai, Nagoya, all of Japan

[73] Assignee: Nippondenso Co., Ltd., Kariya, Japan

[21] Appl. No.: 328,798

[22] Filed: Dec. 8, 1981

[30] Foreign Application Priority Data

Dec. 11, 1980 [JP] Japan .................... 55-175138

[51] Int. Cl.³ ............................................ G01L 23/22
[52] U.S. Cl. ....................................................... 73/35
[58] Field of Search .................... 73/35; 123/425, 435

[56] References Cited

U.S. PATENT DOCUMENTS 4,002,155  1/1977  Harned et al. ......................... 73/35
4,279,143  7/1981  Guipaud ................................ 73/35

FOREIGN PATENT DOCUMENTS 2918420  11/1980  Fed. Rep. of Germany ......... 73/35

Primary Examiner—James J. Gill
Attorney, Agent, or Firm—Cushman, Darby & Cushman

[57] ABSTRACT

In a knock detecting apparatus for an internal combustion engine, a comparator receives at one input a knock detection signal from a knock sensor and at the other input a knock discrimination level signal produced by a knock discrimination level generator in accordance with the knock detection signal of the knock sensor. A mask circuit inhibits the passage of the comparison output signal of the comparator during a period in which a number of noises are generated from the internal combustion engine and at the same time interrupts the operation of the knock discrimination level generator.

3 Claims, 4 Drawing Figures

KNOCK DETECTING APPARATUS FOR INTERNAL COMBUSTION ENGINE

BACKGROUND OF THE INVENTION

This invention relates to a knock detecting apparatus for detecting knocking of an internal combustion engine.

In a prior art knock detecting apparatus as shown in FIG. 1, components such as vibration and sound generated by knocking of an internal combustion engine are detected by a knocking detector 1 (knock sensor), and a signal A detected by the knock sensor 1 is supplied to an input circuit 2. The input circuit 2 impedance-converts the signal A and passes by way of a filter only a frequency component of the signal corresponding to the knocking frequency. A signal B passing through the input circuit 2 is supplied to one input terminal of a comparator circuit 4. The output signal B of the input circuit 2 is also supplied to a knock discrimination level generator 3. This generator 3 integrates the signal B and forms a reference level signal C for the discrimination of knocking. The comparator 4 compares the signals B and C and yields a knock signal D which is indicative of the existence of knocking, when the signal B is larger than the signal C.

However, an internal combustion engine has many noise sources such as ingition noise, rotation and vibration of the engine. Such a noise is riding on the output line, the power source line, the earth line, etc. Therefore, it is unavoidable that the noise is superimposed on the normal output signal A of the knock sensor 1. Thus, in such a prior art constitution as described above, the output level signal C of the knock discrimination level generator 3 is influenced by noise. The problem is that the knock discrimination level varies with the amplitude of noise and the rotational speed of the engine, and hence no accurate detection of knocking is possible.

SUMMARY OF THE INVENTION

An object of this invention is to solve the above problem and to provide a knock detecting apparatus for an internal combustion engine in which accurate detection of knocking is possible in the range from a low speed to a high speed of the engine even if noise such as ignition noise is superimposed on the output signal of the knock sensor.

The above-mentioned object of this invention is attained by a knock detecting apparatus for an internal combustion engine preferably comprising a knock sensor for detecting factors generated by knocking, a knock discrimination level generator which forms a knock discrimination level in accordance with the output of the knock sensor, a comparator connected to the knock sensor and the knock discrimination level generator and comparing the output signal of the knock sensor with the knock discrimination level to generate, depending on the result of comparison, a knock signal which is indicative of the existence of knocking, and a mask circuit which generates a masking pulse for selectively inhibiting the passage of the knock signal from the comparator, the mask circuit making inoperative the knock discrimination level generating circuit when the comparator generates a knock signal during the period of masking pulse generation.

According to this invention, during a period when the generation of strong noise is anticipated, the mask circuit inhibits toward the output terminal, the passage of a knock signal indicative of the existence of knocking and makes inoperative the knock discrimination level generation circuit only when a knock signal is generated in the period. Therefore, even if ignition noise and so on is superimposed on the detection signal of the knock sensor, knocking of the internal combustion engine can be detected accurately. Furthermore, by combining the apparatus of this invention with an ignition timing control apparatus which delays the ignition time only when knocking is generated, effects of increasing the output of engine and improving the fuel consumption can be expected.

DESCRIPTION OF THE PREFERRED EMBODIMENTS

Figure 1:
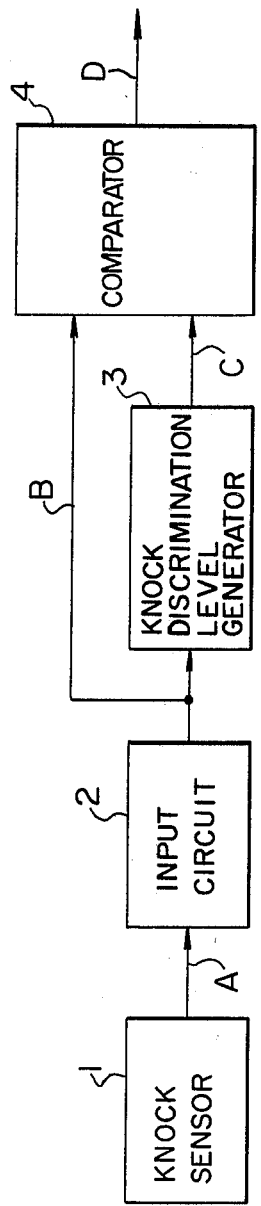
FIG. 1 is a block diagram showing brief constitution of a prior art apparatus.

The invention will be explained hereinafter with reference to embodiments shown in the drawings.

Figure 2:
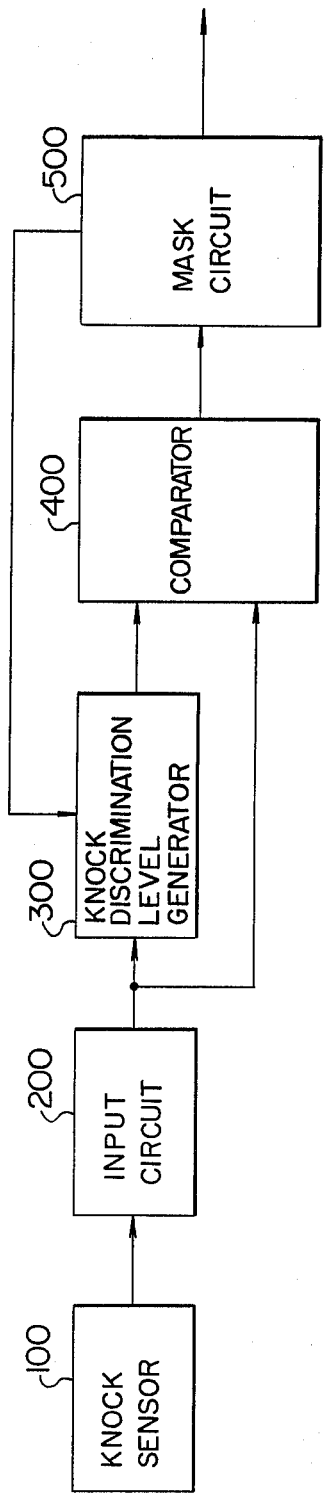
FIG. 2 is a block diagram showing brief constitution of an apparatus of this invention.

FIG. 2 is a block diagram showing brief constitution of this invention. In FIG. 2, a reference numeral 100 denotes a knock sensor for detecting factors such as vibration, sound and pressure in the cylinder of an internal combustion engine (not shown) which are generated with knocking. The sensor is constituted by a vibration detector for detecting the vibration of the internal combustion engine. 200 denotes an input circuit which processes the detection signal of the knock sensor 100 such that only a frequency component of the signal corresponding to the knocking frequency is passed. As described later, the input circuit is constructed with a buffer circuit which impedance-converts the detection signal of the knock sensor 100 and with a filter circuit which takes out only the frequency component contained in knocking from the detection signal. 300 is a knock discrimination level generator which forms a discrimination level to discriminate the existence of knocking in accordance with the detection signal from the knock sensor 100. In the case of the embodiment of this invention, as described below, the generator 300 is constituted by a rectification-integration-amplification circuit which rectifies, integrates and amplifies the output signal of the input circuit 200. 400 is a comparator which compares the output signal of the input circuit 200 or the detection signal of the knock sensor 100 with the knock discrimination level of the knock discrimination level generator 300. When the output signal of the input circuit 200 exceeds the knock discrimination level, the comparator 400 confirms the existence of knocking and generates a knock signal. 500 denotes a mask circuit which gates and inhibits the passage of the output signal from the comparator 400 during the period when the generation of strong noise is anticipated from the internal combustion engine, and furthermore makes inoperative the knock discrimination level generator 300 when the comparator 400 generates a knock signal in the above period. Namely, in the embodiment of the invention, the mask circuit 500 interrupts the rectification function of the rectification-integration-amplification circuit.

Figure 3:
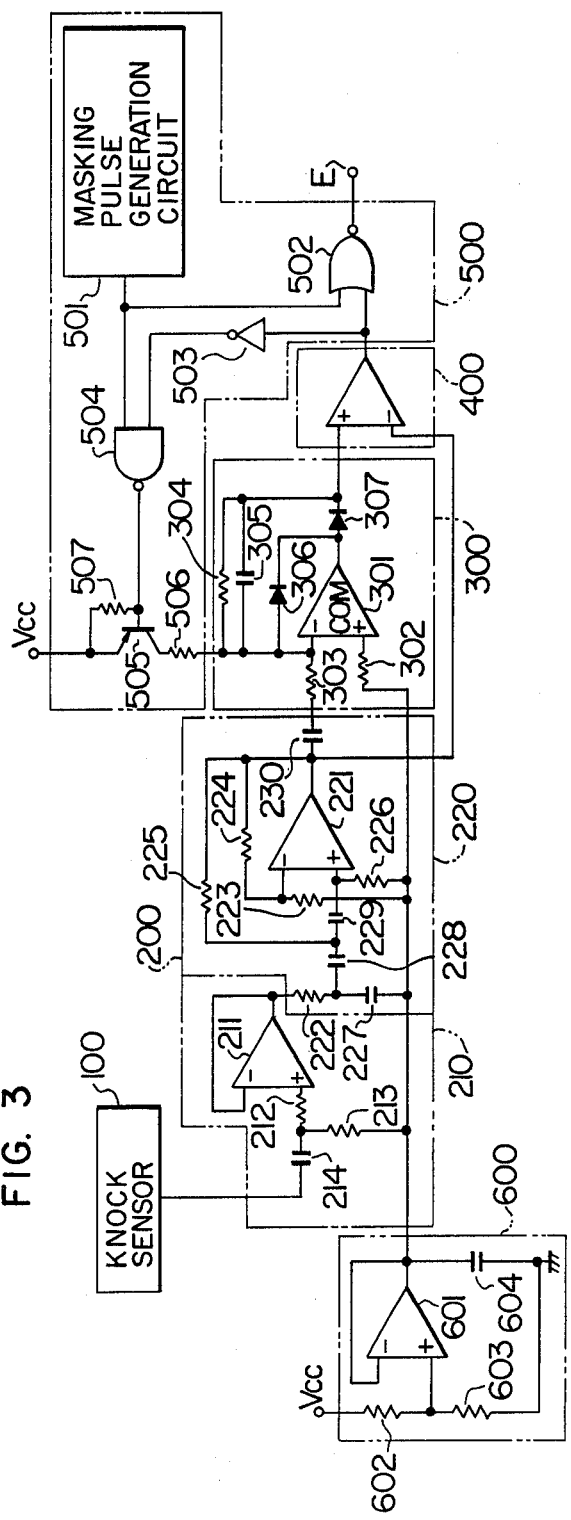
FIG. 3 is an electrical circuit diagram showing a concrete circuit of the apparatus of this invention.

FIG. 3 is an example of the concrete circuit showing the constitution of this invention as shown in FIG. 2. In FIG. 3, the input circuit 200 is constituted by a buffer circuit 210 which converts the detection signal of the knock sensor 100 to a low impedance, and a filter circuit 220 which eliminates the frequency components other than the knocking frequency. The buffer circuit 210 is formed by an operational amplifier 211 (hereinafter called as "OP amp"), resistors 212 and 213, and a capacitor 214. The filter circuit 220 forms a low pass filter by a resistor 222 and a capacitor 227, and a high pass filter by resistors 223, 224, 225 and 226, capacitors 228 and 229, and an OP amp 221. A capacitor 230 is a coupling capacitor. The knock discrimination level generator 300 which generates a knock discrimination level is a rectification-integration-amplification circuit in the embodiment of FIG. 3, and is formed by an OP amp 301, resistors 302, 303 and 304, a capacitor 305, and diodes 306 and 307. 400 denotes a comparator which is formed by a comparator comparing the output of the filter circuit 221 with the knock discrimination level given by the knock generator 300. In the mask circuit 500, the masking pulse generation circuit 501 generates a "high" level masking pulse in an engine crank angle period where the generation of strong noise is anticipated (in the embodiment of this invention, a period from a predetermined reference crank angle to a predetermined crank angle after ignition including the ignition timing). The period will be hereinafter referred to as a "masking period". Determination of the engine crank angle of the masking pulse generation circuit 501 can be made by receiving a timing signal obtained by electromagnetically detecting the gears of the engine ring (not shown). In the mask circuit 500, a NOR gate 502 inhibits the passage of the output signal (knock signal) of the comparator 400 to an output terminal E while the masking pulse is being generated. 503 is an inverter, 504 is a NAND gate, 505 is a transistor, and 506 and 507 are resistors. The emitter of the transistor 505 is connected to a power supply Vcc, and the collector thereof is connected through the resistor 506 to an inverting input terminal (−) of the OP amp 301 of the knock generator 300. It is constituted in such a manner that when the transistor 505 becomes conducting, the rectification-integration-amplification circuit 300 stops its rectificatrion function. 600 is a reference voltage forming circuit which is formed by resistors 602 and 603, a capacitor 604 and an OP amp 601. The power supply Vcc is connected to one end of the resistor 602 to give a reference potential to each circuit.

Next, the operation of the constitution shown in FIG. 3 will be explained.

The signal detected by the knock sensor 100 enters the buffer circuit 210 and is converted to a low impedance signal. Thereafter, the low pass filter and the high pass filter of the filter circuit 220 eliminate the noise component having frequencies which are different from the knocking frequency. The signal passing the filter circuit 220 enters the knock generator 300 and is half-wave-rectified, integrated and amplified to form a knock discrimination level. In the comparator 400, the signal passing the filter circuit 200 is compared with a knock discrimination level. When the signal exceeds the discrimination level, a "low" level signal indicative of the existence of knocking is generated.

However, in a period when strong noise such as ignition noise and so on is generated in the engine, that is, in the mask period, the noise contains wide range frequency components. The component of noise lying in the same frequency range as that of the knocking frequency is not eliminated by the filter circuit 220, and appears in the output of the filter circuit 220 superimposed on the detection signal of the knock sensor 100. Since the output signal mixed with noise enters the comparator 400 directly, the output signal of the comparator circuit 400 in the mask period does not indicate the existence of knocking accurately. Therefore, in the mask period, a "high" level masking pulse from the masking pulse generation circuit 501 of the mask circuit 500 is applied to the NOR gate 502 to inhibit the passage of the output signal of the comparator 400 to the output terminal E.

On the other hand, since the output signal of the filter circuit 200 of the mask period also supplied to the knock generator 300 is superimposed with noise, the knock discrimination level is influenced by noise. This disturbs the formation of an accurate knock discrimination level. Therefore, in the mask circuit 500, the output signal of the comparator circuit 400 is applied through the inverter 503 and the NAND gate 504 to the base of the transistor 505. The transistor 505 is made conductive only when a "low" level signal, that is a signal indicative of the existence of knocking is generated by the circuit 400 during the mask period. As a result, the electric potential of the inverting input terminal (−) of the OP amp 301 of the knock generator 300 rises, interrupting the half wave rectification. In this manner, inaccuracy of the knock discrimination level due to noise is prevented. In this embodiment, it should be noted that the transistor 505 is not made conductive and the half wave rectification is prohibited without regard to the output signal of the comparator 400 throughout the mask period. This is because of the fact that the mask period is relatively long and the capacitor 305 may discharge in the period. This should be removed because the knock discrimination level becomes inaccurate.

In this way, an accurate knock signal appears at the output terminal E.

Figure 4:
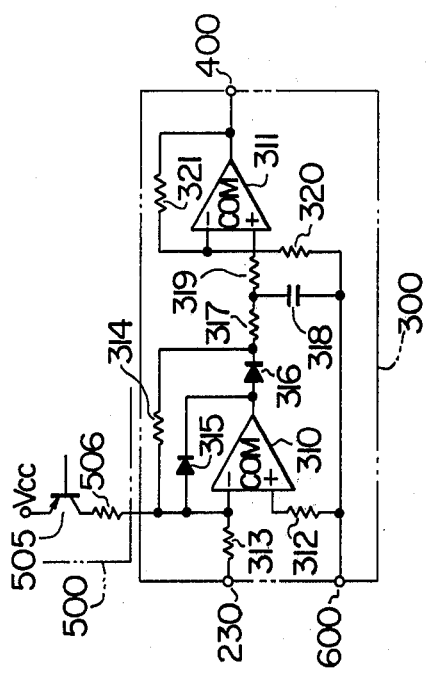
FIG. 4 is an electrical circuit diagram showing another embodiment of the rectification-integration-amplification circuit shown in FIG. 3.

FIG. 4 shows another embodiment of the rectifiction-integration-amplification circuit shown in FIG. 3. In FIG. 4, a knock discrimination level generator 300' performs half wave rectification by an OP amp 310, resistors 312, 313 and 314, and diodes 315 and 316, integration by a resistor 317 and a capacitor 318, and amplification by an OP amp 311 and resistors 319, 320 and 321. Namely, although the knock generator 300 of FIG. 3 performs rectification, integration and amplification by one OP amp, the circuit of FIG. 4 uses two OP amp's to share each function.

We claim:

1. A knock detecting apparatus for an internal combustion engine comprising:
   a knock sensor for detecting knocking components generated by the internal combustion engine and generating an electrical signal;
   a knock discrimination level generator for generating a knock discrimination level signal in accordance with the output signal of said knock sensor;
   a comparator for comparing the output signal of said knock sensor with said knock discrimination level signal and generating, depending on the result of comparison signal, a knock signal indicative of the existence of knocking; and a mask means for generating a masking pulse for selectively inhibiting the transmission of signal from said comparator, said mask means making inoperative the knock discrimintion level generation circuit when said comparator generates a knock signal during the period of said masking pulse generation, wherein said mask means comprises a masking pulse generation circuit for generating masking pulses in synchronization with the rotation of the internal combustion engine, a first gate circuit for inhibiting the passage of said comparison output signal from said comparator in response to the pulse signal from said masking pulse generation circuit, a second gate circuit for allowing the transmission of said comparison output signal from said comparator in response to the pulse signal from said masking pulse generation circuit, and a buffer circuit for supplying said comparison output passing through said second gate circuit to said knock discrimination level generator.

2. A knock detecting apparatus according to claim 1, wherein said knock discrimination level generator comprises an operational amplifier having an inverting input terminal to which a detection signal from said knock sensor is applied and having a non-inverting input terminal to which a reference signal is applied, a first diode having an anode electrode which is connected to the output terminal of said operational amplifier, a parallel circuit of a resistor and a capacitor which is connected between the cathode electrode of said first diode and the inverting input terminal of said operational amplifier, and a second diode connected between the inverting input terminal and the output terminal of said operational amplifier.

3. A knock detecting apparatus for an internal combustion engine comprising:

a knock sensor for detecting knocking components generated by the internal combustion engine and generating an electrical signal;

a knock discrimination level generator for generating a knock discrimination level signal in accordance with the output signal of said knock sensor;

a comparator for comparing the output signal of said knock sensor with said knock discrimination level signal and generating, depending on the result of comparison signal, a knock signal indicative of the existence of knocking; and a mask means for generating a masking pulse for selectively inhibiting the transmission of signal from said comparator, said mask means making inoperative the knock discrimination level generation circuit when said comparator generates a knock signal during the period of said masking pulse generation, wherein said knock discrimination level generator comprises an operational amplifier having an inverting input terminal to which a detection signal from said knock sensor is applied and having a non-inverting input terminal to which a reference signal is applied, a first diode having an anode electrode which is connected to the output terminal of said operational amplifier, a parallel circuit of a resistor and a capacitor which is connected between the cathode electrode of said first diode and the inverting input terminal of said operational amplifier, and a second diode connected between the inverting input terminal and the output terminal of said operational amplifier.

* * * * *